United States Patent

Drecoll

[11] Patent Number: 6,163,523
[45] Date of Patent: Dec. 19, 2000

[54] METAL MASTER FOR PRODUCING OPTICAL DISCS

[75] Inventor: Harm Drecoll, Stein am Rhein, Switzerland

[73] Assignee: Innovators AG, Neufausen am Rheinfall, Switzerland

[21] Appl. No.: 09/331,464

[22] PCT Filed: Dec. 12, 1997

[86] PCT No.: PCT/EP97/06985

§ 371 Date: Aug. 11, 1999

§ 102(e) Date: Aug. 11, 1999

[87] PCT Pub. No.: WO98/27551

PCT Pub. Date: Jun. 25, 1998

[30] Foreign Application Priority Data

Dec. 19, 1996 [DE] Germany ............... 196 53 078

[51] Int. Cl.$^7$ ............... G11B 7/24; C25D 5/02
[52] U.S. Cl. ............... 369/275.5; 205/118
[58] Field of Search ............... 205/118, 122; 369/275.1, 275.5

[56] References Cited

U.S. PATENT DOCUMENTS

| | | | |
|---|---|---|---|
| 4,729,940 | 3/1988 | Nee et al. | 205/655 |
| 5,147,763 | 9/1992 | Kamitakahara | 430/320 |
| 5,283,159 | 2/1994 | Norton et al. | 430/270.15 |
| 5,494,782 | 2/1996 | Maenza et al. | 430/321 |
| 5,509,991 | 4/1996 | Choi | 156/245 |

FOREIGN PATENT DOCUMENTS

| | | |
|---|---|---|
| 0 418 897 A2 | 3/1991 | European Pat. Off. . |
| 0 667 608 A1 | 8/1995 | European Pat. Off. . |
| 36 13 334 C2 | 10/1987 | Germany . |
| 37 12 128 C2 | 10/1988 | Germany . |
| 37 15 315 A1 | 11/1988 | Germany . |
| 40 29 099 A1 | 4/1992 | Germany . |
| 195 10 096 A1 | 9/1996 | Germany . |
| 1-037738 | 2/1989 | Japan . |

*Primary Examiner*—Kathryn Gorgos
*Assistant Examiner*—Erica Smith-Hicks
*Attorney, Agent, or Firm*—Herbert Dubno

[57] ABSTRACT

Method for producing a press-form (a stamper) for shaping an information-carrying optical storage medium, wherein in a first step, tracks are burned into the covering layer-coated (5) surface (3) of a blank (1) by a laser beam (6) according to the information to be stored before the tracks (7) are filled with metal in an electroplating process in a further step of said method, wherein the blank (1) is made from a cut or stamped metal disc (2) whose surface (3) is ground and polished.

16 Claims, 1 Drawing Sheet

METAL MASTER FOR PRODUCING OPTICAL DISCS

The invention relates to a process for producing a press-form (stamper) for shaping an information-carrying optical storage medium (compact disk, CD), whereby in one process step tracks are burned by means of a laser beam into the surface of a blank covered with a covering layer, according to the information to be stored, before the tracks are filled with metal in an electroplating process, in a further process step.

Essentially two methods for producing a stamper are known. In a first method ("Photoresist Mastering") a blank in the form of a glass plate with a photosensitive surface is exposed to a focused laser beam. During the chemical development of the photosensitive surface, the exposed portions develop depressions, while the surface between the exposed portions is not affected. In another method("Non Photoresist Mastering") the blank is coated with a layer of organic material (organic dye). In this layer depressions are directly burned, respectively melted by means of a laser beam.

The glass master produced in one of the mentioned ways is coated with a thin metallic layer, before the depressions are filled in an electrolytic process and a base is formed thereon (electroforming). The base with the raised data structures is separated from the glass master and cleaned and then used as a stamper.

The finishing of the CDs takes place in an injection molding chamber, wherein optical polycarbonate is sprayed under pressure onto the stamper. Afterwards the stamper and the finished CDs are separated from each other by compressed air and the surface of the CDs is covered with a reflective coating and lacquered.

The drawback of the known methods is that they are complicated and expensive due to the numerous process steps. Besides the stampers made through electroforming have a relatively short life, since the metal applied in the electroplating process has little strength. So for instance with one stamper merely a few thousand CDs can be pressed, before the quality of the stamper is lost because of the extreme conditions in the injection molding machine (1800 gauge pressure and 380° C.).

It is the object of the invention to create a method by means of which, with little time and expenses, a resistant stamper for forming of optical storage media (compact disks) can be produced.

This object is achieved due to the fact that the covering layer rests on a metallic surface.

Thereby it is particularly advantageous to make the blank into a metallic disk, particularly of sheet metal. Due to the method of the invention, it is possible to produce stampers in a cost-effective manner, thereby reducing the costs of producing compact disks. This cost savings is a result of a reduction in the number of process steps. So for instance on the one hand the finishing of the raw glass plate is eliminated, and on the other hand the energy-intensive electroforming process is replaced by an electroplating process which consumes less current, wherein considerably less metal has to be deposited.

The stampers produced with the method of the invention are particularly resistant, since their base plate consist of cold-rolled sheet metal, which is commercially available in a state of high purity and with a reflecting surface. As a metal for the blank preferably nickel with a purity of particularly 99.5% is used. Due to a densified crystalline structure, the rolled nickel sheet is harder than the metal deposited during electroforming. The rolled sheet metal has only to be stamped out or cut in the desired shape. However the quality of the metallic blank can be further improved by grinding and polishing.

The clean metallic disk is preferably provided on the surface to be inscribed at first with adhesive ground (primer), which insures a good hold of the subsequently to be applied lacquer layer and which prevents acid penetration under the lacquer in the electroplating bath. In order to achieve an even distribution of the lacquer layer to be applied on the primer, the lacquer or a resin is sprayed in a centrifuge on the metallic blank. Thereby a uniform thickness of the lacquer of a few micrometers can be produced.

Corresponding to the information to be stored, a laser beams burns tracks into the covering layer made of lacquer in the form of depressions whose depth corresponds to the thickness of the covering layer. At the bottom of the tracks the surface of the metallic blank is revealed. Thereby it is advantageous when the surface of the blank is insensitive to intensity variations of the inscribing laser beam, since the laser beam burns down all the way to the bottom of the metallic blank and there could produce damage only when the power output increases.

In order to insure a simple separation of the stamper from the finished CD, it is advantageous to provide the structured surface of the stamper with a thin platinum layer, particularly by vapor deposition. Thereby the roughness of the stamper is evened out, so that the plastic material can not lodge in possible pores in the electroplated tracks.

The method of the invention is illustrated with the aid of the drawings and is subsequently closer described.

BRIEF DESCRIPTION OF THE DRAWINGS

FIG. 1 shows a blank 1, which has a base of disk 2 made of metal, particularly nickel of a purity of 99.5%. The disk 2 was cut out or stamped out of sheet metal in the corresponding shape. The surface 3 of the disk 2 is ground and polished to a high gloss and coated with a layer of adhesive ground (primer). The primer 4 provides the sealing of the surface 3 and forms the basis for a covering layer 5. The covering layer 5 is a synthetic resin lacquer, which has good absorption characteristics for light of defined wave length. The thickness of the layers is not shown at the real scale in the Figures. While the metal disk has a thickness of several millimeters, the primer 4 is applied very thinly. The thickness of the covering layer 5 amounts to several micrometers.

Figure 1:
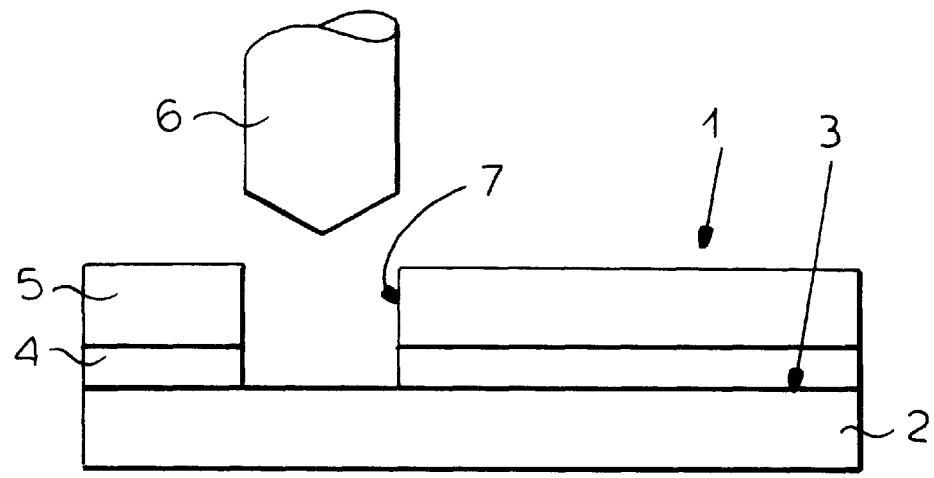
FIG. 1 is a sectional view of the surface of a blank during inscription.

While the blank 1 is continuously rotated, a laser beam 6 burns a depression into the covering layer 5, so that the surface 3 is revealed. The wave length of the laser beam is coordinated with the absorption characteristics of the covering layer 5. The depressions 7 form tracks wherein the information is stored. Thereby it has to be noted that the rotation direction of the blank 1 during inscription is opposite to the running direction of the future compact disk. The information is imprinted on the blank in a mirror-image-like fashion.

Figure 2:
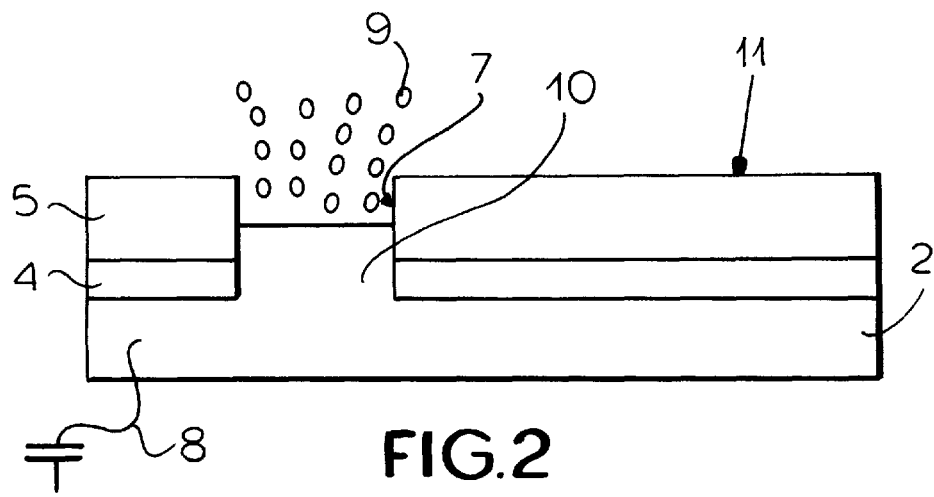
FIG. 2 is a sectional view of the surface of a blank during electroplating.

In FIG. 2 the inscription process has been concluded. The cleaned blank 1 is put into an electroplating bath, whereby the disk 2 is set to the corresponding voltage via a line 8. During the electrolysis metal ions 9 are moved and deposit themselves as metallic projections 10 on the surface 3. The composition of the electrolytic bath is so that the deposited metal is the metal of the disk 2, in this case nickel.

This way during the electrolysis the depressions 7 are filled up. The thickness of the metallic projections 10 is selected via the time span in which the electric voltage is applied. The electrolytic process is interrupted as soon as the depressions 7 are filled up to approximately 1.5 micrometers, however not higher than up to the surface 11 of the covering layer 5.

Figure 3:
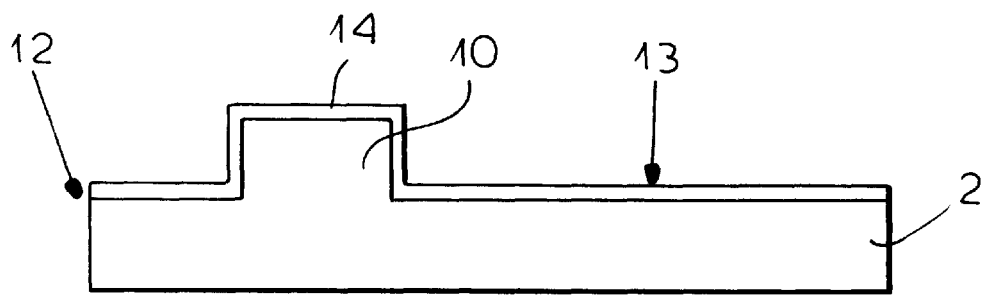
FIG. 3 is a sectional view of the surface of a finished stamper.

After the electroplating process, the remaining covering layer 5 and the primer 4 are removed by means of a laser beam. After a final cleaning the finished stamper 12 with metal projections 10 is ready to be used (FIG. 3). In order to finish the stamper 12, the printing surface 13 is covered with a platinum layer 14 by vapor deposition.

With the described method it is possible not only to produce stampers 12 directly, when in the known process the glass plate is replaced by a metal disk, it is also possible to produce highly resistant master disks for the production of stampers.

What is claimed is:

1. A method for producing a press-form or stamper for shaping an information carrying optical storage medium, the method comprising providing a metal blank with a metallic surface, said metallic surface coated with a covering layer;

performing an inscription process comprising burning tracks in said coated metallic surface of said blank by a laser beam, said tracks corresponding to the information to be stored, and filling said tracks with a metal by an electroplating technique.

2. The method according to claim 1, characterized in that the metal blank is a disk.

3. The method according to claim 1, characterized in that the step of providing the blank includes cutting- out or stamping-out the blank from sheet metal.

4. The method according to claim 1, characterized in that the step of providing the blank includes grinding and polishing a coated metallic surface of the blank prior to burning tracks.

5. The method according to claim 4, characterized in that the step of providing the blank further includes depositing an adhesive ground primer on said ground and polished coated metallic surface of said blank.

6. The method according to claim 1, characterized in that the covering layer comprises organic lacquer and has a thickness of a few micrometers.

7. The method according to claim 1, characterized in that the step of performing an inscription process comprises using a laser beam for burning tracks corresponding to the information to be stored in the covering layer in the form of depressions whose depth corresponds to the thickness of said covering layer so that a bottom of the tracks are formed by the metallic surface of the blank.

8. The method according to claim 7, characterized in that a step of filling said depressions with a metal using an electroplating technique comprises interrupting the electroplating as soon as the tracks have been filled up to the surface of the covering layer when approximately 1.5 micrometers of said depressions have been filled.

9. The method according to claim 8, characterized in that the metal electroplate to fill said depressions is of a same kind of metal used for said disk.

10. The method according to claim 1, characterized in that the remaining covering layer is removed after said depressions have been filled.

11. The method according to claim 10, characterized in that the remaining covering layer is removed by means of a laser beam.

12. The method according to claim 1, characterized in that the blank is cleaned between process steps.

13. The method according to claim 1, characterized in that the blank is made of nickel with a purity of particularly 99.5%.

14. The method according to claim 1, characterized in that the finished press-form (stamper) is coated with a thin platinum layer.

15. The method according to claim 1, characterized in that during the inscription process the information is burned into the covering layer in a mirror-image fashion in relation to the finished compact disk.

16. A metallic master disk inscribed with information for producing a stamper formed by the method of claim 1.

* * * * *